United States Patent [19]

Frame

[11] 4,290,913

[45] * Sep. 22, 1981

[54] CATALYTIC COMPOSITE USEFUL FOR THE TREATMENT OF MERCAPTAN-CONTAINING SOUR PETROLEUM DISTILLATE

[75] Inventor: Robert R. Frame, Glenview, Ill.

[73] Assignee: UOP Inc., Des Plaines, Ill.

[ * ] Notice: The portion of the term of this patent subsequent to Jun. 3, 1997, has been disclaimed.

[21] Appl. No.: 91,929

[22] Filed: Nov. 7, 1979

Related U.S. Application Data

[63] Continuation-in-part of Ser. No. 927,318, Feb. 24, 1978, Pat. No. 4,124,493.

[51] Int. Cl.$^3$ ..................... B01J 23/04; B01J 31/18

[52] U.S. Cl. ..................... 252/428; 252/431 N; 208/206

[58] Field of Search ..................... 252/428, 431 N; 208/206

[56] References Cited

U.S. PATENT DOCUMENTS 2,744,854 5/1956 Urban ..................... 208/206

4,033,860 7/1977 Carlson ..................... 208/206

*Primary Examiner*—W. J. Shine

*Attorney, Agent, or Firm*—James R. Hoatson, Jr.; Thomas K. McBride; William H. Page, II

[57] ABSTRACT

Disclosed is a catalytic composite especially useful in the treatment of sour mercaptan-containing petroleum distillates. The catalytic composite comprises a metal chelate, an alkali metal hydroxide, and a quaternary ammonium hydroxide disposed on an adsorptive support. Also disclosed is a method for treating sour mercaptan-containing petroleum distillates by contacting the distillates at oxidation conditions with the foregoing catalytic composite.

11 Claims, No Drawings

CATALYTIC COMPOSITE USEFUL FOR THE TREATMENT OF MERCAPTAN-CONTAINING SOUR PETROLEUM DISTILLATE

CROSS-REFERENCE TO RELATED APPLICATION

This application is a Continuation-In-Part of a co-pending application Ser. No. 927,318 filed July 24, 1978, now U.S. Pat. No. 4,206,079, which latter application is a Continuation-in-Part of application Ser. No. 880,723, filed Feb. 24, 1978, now U.S. Pat. No. 4,124,493, said applications are hereby incorporated herein by reference.

BACKGROUND OF THE INVENTION

1. Field of the Invention

The field of art to which the claimed invention pertains is catalytic composites and processes useful for treating sour petroleum distillates. More specifically, the claimed invention relates to catalysts and catalytic processes especially useful for the treatment of sour petroleum distillates to effect the oxidation of mercaptans in the distillate to disulfides.

2. Description of the Prior Art

Processes for the treatment of sour petroleum distillates wherein the distillate is treated in contact with an oxidation catalyst in the presence of an oxidizing agent at alkaline reaction conditions have become well known and widely practiced in the petroleum refining industry. Said processes are typically designed to effect the oxidation of offensive mercaptans contained in a sour petroleum distillate with the formation of innocuous disulfides—a process commonly referred to as sweetening. The oxidizing agent is most often air. Gasoline, including natural, straight run and cracked gasolines, is the most frequently treated sour petroleum distillate. Other sour petroleum distillates include the normally gaseous petroleum fraction as well as naphtha, kerosine, jet fuel, fuel oil, lube oil, and the like.

A commonly used continuous process for treating sour petroleum distillates entails treating the distillate in contact with a metal phthalocyanine catalyst dispersed in an aqueous caustic solution to yield a doctor sweet product. The sour distillate and the catalyst-containing aqueous caustic solution provide a liquid-liquid system wherein mercaptans are converted to disulfides at the interface of the immiscible solutions in the presence of an oxidizing agent—usually air. Sour petroleum distillates containing more difficultly oxidizable mercaptans are more effectively treated in contact with a metal chelate catalyst disposed on a high surface area adsorptive support—usually a metal phthalocyanine on an activated charcoal. The distillate is treated in contact with the supported metal chelate catalyst at oxidation conditions in the presence of an alkaline agent. One such process is described in U.S. Pat. No. 2,988,500. The oxidizing agent is most often air admixed with the distillate to be treated, and the alkaline agent is most often an aqueous caustic solution charged continuously to the process or intermittently as required to maintain the catalyst in a caustic-wetted state.

Heretofore, the practice of catalytically treating mercaptan-containing sour petroleum distillates has involved the introduction of alkaline agents, usually sodium hydroxide, into the sour petroleum distillate prior to or during the treating operation. (U.S. Pat. Nos. 3,108,081, 4,156,641). The prior art also suggests the addition to the petroleum distillate along with certain alkaline agents of certain non-alkaline additives. (U.S. Pat. Nos. 4,124,493, 4,033,860). In addition, the prior art suggests the use in an alkaline environment of certain catalytic composites produced from metal phthalocyanine solutions containing certain non-alkaline additives. (U.S. Pat. Nos. 4,087,378, 4,124,531). Finally, the prior art suggest the use of certain chemicals, including sodium hydroxide, to increase the solubility of metal phthalocyanine in aqueous solutions from which metal phthalocyanine catalysts to be used in alkaline environments are made. (U.S. Pat. No. 3,108,081). The prior art does not disclose or suggest the treating of a mercaptan-containing sour petroleum distillate by contacting the distillate at oxidation conditions with an oxidizing agent and a catalytic composite comprising a metal chelate, an alkali metal hydroxide, and a quaternary ammonium hydroxide, disposed on an adsorptive support. The catalytic composite of this invention can be used in the treating process of this invention with or without the necessity of addition of an alkaline agent. The consequent savings in materials handling and storage expenses, and avoidance of use of hazardous alkaline chemicals in the treating process, have been long desired.

SUMMARY OF THE INVENTION

It is a broad objective of my invention to present a novel catalytic composite and method for treating sour petroleum distillates.

In one of its broad aspects, the present invention embodies a catalytic composite comprising a metal chelate, an alkali metal hydroxide, and a quaternary ammonium hydroxide disposed on an adsorptive support, said quaternary ammonium hydroxide represented by the structural formula $$\left[ R'-\overset{\displaystyle R}{\underset{\displaystyle R}{\overset{|}{\underset{|}{N}}}}-R \right]^{+} OH^{-}$$

wherein R is a hydrocarbon radical containing up to about 20 carbon atoms and selected from the group consisting of alkyl, cycloalkyl, aryl, alkaryl and aralkyl, and R′ is a substantially straight-chain alkyl radical containing from about 5 to about 20 carbon atoms.

In another of its broad aspects, the present invention embodies a method of treating a mercaptan-containing sour petroleum distillate by contacting said distillate at oxidation conditions with the catalytic composite described in the preceding paragraph.

Other objects and embodiments of this invention will become apparent in the following detailed description.

DESCRIPTION OF THE INVENTION

Any of the hydroxides of the metals of Group I-A of the Periodic Chart—the alkali metal hydroxides—can be used as a component of this invention. The alkali metal hydroxide component of this invention can be a single alkali metal hydroxide, or a mixture of two or more alkali metal hydroxides. The preferred alkali metal hydroxide for use in this invention is sodium hydroxide. Potassium hydroxide is also preferred. The alkali metal hydroxides are widely available commercially. They may be made by the electrolysis of aqueous alkali-salt solutions, usually the chloride salt, or by the hydration of alkali metal hydrides.

The metal chelate employed in the practice of this invention can be any of the various metal chelates known to the treating art as effective to catalyze the oxidation of mercaptans contained in a sour petroleum distillate with the formation of polysulfide oxidation products. Said metal chelates include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; and the like. Metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate or a mixture thereof being particularly preferred. The sulfonated derivatives may be prepared, for example, by reacting cobalt, vanadium or other methal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The quaternary ammonium hydroxide component of the catalytic composite of this invention is represented by the structural formula $$\left[\begin{array}{c} R \\ | \\ R'-N-R \\ | \\ R \end{array}\right]^{+}OH^{-}$$

wherein R is a hydrocarbon radical containing up to about 20 carbon atoms and selected from the group consisting of alkyl, cycloalkyl, aryl, alkaryl and aralkyl and R' is a substantially straight-chain alkyl radical containing from about 5 to about 20 carbon atoms. It is preferred that one R radical be an alkyl radical containing from about 12 to about 18 carbon atoms, and another R radical be a benzyl radical. Preferred quaternary ammonium hydroxides thus include a benzyldimethylalkylammonium hydroxide such as benzyldimethyldodecylammonium hydroxide, benzyldimethyltetradecylammonium hydroxide, benzyldimethylhexadecylammonium hydroxide, benzyldimethyloctadecylammonium hydroxide, and the like. Other suitable quaternary ammonium hydroxides include dimethylcyclohexyloctylammonium hydroxide, diethylcyclohexyloctylammonium hydroxide, dipropylcyclohexyloctylammonium hydroxid,e, dimethylcyclohexyldecylammonium hydroxide, diethylcylohexyldecylammonium hydroxide, dipropylcyclohexyldecylammonium hydroxide, dimethylcyclohexyldodecylammonium hydroxide, diethylcyclohexyldodecylammonium hydroxide, dipropycyclohexyldodecylammonium hydroxide, dimethylcyclohexyltetradecylammonium hydroxide, diethylcyclohexyltetradecylammonium hydroxide, dipropylcyclohexyltetradecylammonium hydroxide, dimethylcyclohexylhexadecylammonium hydroxide, diethylcyclohexylhexadecylammonium hydroxide, dipropylcyclohexylhexadecylammonium hydroxide, dimethylcyclohexyloctadecylammonium hydroxide, diethylcyclohexyloctadecylammonium hydroxide, dipropylcyclohexyloctadecylammonium hydroxide, and the like. Other suitable quaternary ammonium hydroxides are described in U.S. Pat. No. 4,156,641.

The adsorbent support employed herein can be any of the well known adsorbent materials generally utilized as catalyst support or carrier material. Preferred adsorbent materials include the various charcoals produced by the destructive distillation of wood, peat, lignite, nutshells, bones, and other carbonaceous matter, and preferably such charcoals as have been heat-treated or chemically treated or both, to form a highly porous particle structure of increased adsorbent capacity, and generally defined as activated carbon or charcoal. Said adsorbent materials also include the naturally occurring clays and silicates, e.g., diatomaceous earth, fuller's earth, kieselguhr, attapulgus clay, feldspar, montorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate, the adsorbent support should be insoluble in, and otherwise inert to, the petrolum distillate at the alkaline reaction conditions existing in the treating zone. Charcoal, and particularly activated charcoal, is preferred because of its capacity for metal phthalocyanine, and because of its stability under treating conditions.

The alkali metal hydroxides and quaternary ammonium hydroxides of this invention, as well as the metal chelate, particularly the metal phthalocyanines, are readily disposed on the adsorbent support. The alkali metal hydroxide may comprise at least about 10 wt. % of the catalytic composite. In the sweetening process herein contemplated, the alkali metal hydroxide will preferably comprise at least about 20 wt. % of the said composite and the quaternary ammonium hydroxide will comprise at least about 10 wt. % of said composite. In general, up to about 25 wt. % metal phthalocyanine can be adsorbed on the solid adsorbent support and still form a stable catalytic composite. A lesser amount in the range of from about 0.1 to about 10 wt. % generally forms a suitably active catalytic composite.

The alkali metal hydroxide, the quaternary ammonium hydroxide, and the metal chelate components can be disposed on the adsorbent support in any conventional or otherwise convenient manner. Said components can be disposed on said support simultaneously from a common aqueous or alcoholic solution and/or dispersion thereof, or separately and in any desired sequence. The disposition process can be effected utilizing conventional techniques whereby the support in the form of spheres, pills, pellets, granules or other particles of uniform or irregular size or shape, is soaked, suspended, dipped one or more times, or otherwise immersed in an aqueous or alcoholic solution and/or dispersion to dispose a given quantity of the alkali metal hydroxide, quaternary ammonium hydroxide, and metal chelate components thereon. One preferred method involves the use of a steam-jacketed rotary dryer. The adsorbent support is immersed in the impregnating solution and/or dispersion contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

An alternative and convenient method for disposing the alkali metal hydroxide, quaternary ammonium hydroxide, and metal chelate components on the solid adsorbent support comprises predisposing the support in a sour petroleum distillate treating zone or chamber as a fixed bed and passing the alkali metal hydroxide-metal chelate-quaternary ammonium hydroxide solution and/or dispersion through the bed in order to form the catalytic composite in situ. This method allows the solution and/or dispersion to be recycled one or more times to achieve a desired concentration of the alkali metal hydroxide, quaternary ammonium hydroxide, and metal chelate components on the adsorbent support. In still another alternative method, the adsorbent may be predisposed in said treating zone or chamber, and the zone or chamber thereafter filled with the solution and/or dispersion to soak the support for a predetermined period.

In the process of sweetening a sour petroleum distillate, it has heretofore been the practice to oxidize the mercaptans contained therein in the presence of an alkaline agent. With respect to the method of this invention, those distillates containing the more readily oxidized mercaptans can be treated in the absence of added alkaline agent. A sour petroleum distillate is passed in contact with the catalytic composite of this invention. The catalytic composite can be dispersed within the distillate, or it can be disposed as a fixed bed in a container. The contacting can be batch-type, or continuous. A continuous treating operation using a fixed bed of the catalytic composite is preferred. An oxidizing agent, preferably air, is introduced to contact the distillate and the catalytic composite to provide at least the stoichiometric amount of oxygen required to oxidize the mercaptan content of the distillate. It may be preferable in treating distillates with high mercaptan content to contact the catalytic composite with an alkaline agent prior to contacting the distillate and the catalytic composite.

Treatment of sour petroleum distillates in contact with the catalytic composite of this invention can be performed in the presence of an alkaline agent as heretofore practiced, if desired. The catalytic composite is initially saturated with an alkaline agent, and an alkaline agent thereafter passed in contact with the catalyst bed, continuously or intermittently as required, admixed with the sour petroleum distillate. Any suitable alkaline agent may be employed. An alkali metal hydroxide in aqueous solution, e.g., sodium hydroxide in aqueous solution, is most often employed. The solution may further comprise a solubilizer to promote mercaptan solubility, e.g., alcohol, and especially methanol, ethanol, n-propanol, isopropanol, etc., and also phenols, cresols, and the like. The solubilizer, when employed, is preferably methanol, and the alkaline solution may suitably comprise from about 2 to about 100 vol. % thereof. Sodium hydroxide and potassium hydroxide constitute the preferred alkaline agents. Others including lithium hydroxide, rubidium hydroxide and cesium hydroxide are also suitably employed.

The method of treating of this invention can be effected in accordance with prior art treating conditions. The process is usually effected at ambient temperature conditions, although higher temperatures up to about 105° C. are suitably employed. Pressures of up to about 1,000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. In fixed bed treating operations, the sour petroleum distillate may be passed upwardly or downwardly through the catalytic composite. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

As heretofore mentioned, the alkali metal hydroxide, quaternary ammonium hydroxide, and metal chelate components of the catalytic composite of this invention are readily adsorbed on the adsorbent support. Thus, any of the said components which may in time be leached from the support and carried away in the reactant stream can be easily restored to the catalytic composite in situ by introducing either or any of said components to the sweetening process, for example, in admixture with the distillate being treated to be disposed on the solid adsorbent support in the treating zone.

The following examples are presented in illustration of two preferred embodiments of this invention and are not intended as undue limitations on the generally broad scope of the invention as set out in the appended claims.

EXAMPLE I

In the preparation of the catalytic composite of this invention, a solution and/or dispersion is formulated by admixing 150 mg. of cobalt phthalocyanine monosulfonate, 150 ml. of a 7 wt. % aqueous solution of sodium hydroxide, and 10 gms. of a 50% alcoholic solution of dimethylbenzylalkylammonium hydroxide, and placing the admixture in a rotary steam evaporator. The benzyldimethylalkylammonium hydroxide is preferably benzyldimethyldodecylammonium hydroxide, benzyldimethyltetradecylammonium hydroxide, benzyldimethylhexadecylammonium hydroxide, and/or benzyldimethyloctadecylammonium hydroxide. About 100 cc of 10×30 mesh activated charcoal particles are immersed in the impregnating solution and tumbled therein for about 1 hour by the rotating motion of the evaporator. Steam is thereafter applied to the evaporator jacket, and the impregnating solution evaporated to dryness in contact with the tumbling charcoal particles over a 1 hour period.

EXAMPLE II

A sour kerosene feedstock boiling in the 352°–454° F. range and containing from about 200 ppm. to about 500 ppm. mercaptan sulfide is converted to a doctor sweet product on changing the feedstock downflow through the catalytic composite at a liquid hydrocarbon space velocity of from about 0.5 to about 3.0, the catalytic composite being disposed as a fixed bed in a tubular reactor. The kerosene feedstock is charged under sufficient air pressure to provide about twice the stoichiometric amount of oxygen required to oxidize the mercaptan content of the kerosene.

Pursuant to one embodiment of this invention, the catalyst bed is initially wetted with a 2 molar aqueous dimethylbenzylalkylammonium hydroxide solution, about 10 cc of said solution per 100 cc of catalyst being subsequently added to the catalyst bed at 12 hour intervals admixed with the sour kerosene charged thereto. The dimethylbenzylalkylammonium hydroxide employed comprises a mixture of dimethylbenzyldodecylammonium hydroxide, dimethylbenzyltetradecylammonium hydroxide, dimethylbenzylhexadecylammonium hydroxide and dimethylbenzyloctadecylammonium hydroxide.

Pursuant to another embodiment of this invention, the kerosene feedstock is charged to the catalyst bed without the intermittent addition of an alkaline agent, the sodium hydroxide and quaternary ammonium hydroxide providing the necessary alkaline environment for the treating reaction.

I claim as my invention:

1. A catalytic composite comprising a metal chelate, an alkali metal hydroxide, and a quaternary ammonium hydroxide disposed on an adsorptive support, the quaternary ammonium hydroxide represented by the structural formula

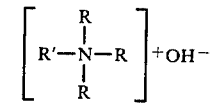

wherein R is a hydrocarbon radical containing up to about 20 carbon atoms and selected from the group consisting of alkyl, cycloalkyl, aryl, alkaryl and aralkyl and R' is a substantially straight-chain alkyl radical containing from about 5 to about 20 carbon atoms, said alkali metal hydroxide comprising at least about 10 wt. % of said catalytic composite.

2. The catalytic composite of claim 1 wherein said alkali metal hydroxide comprises at least about 20 wt. % of said catalytic composite.

3. The catalytic composite of claim 1 wherein said alkali metal hydroxide comprises at least 20 wt. % of said catalytic composite and said quaternary ammonium hydroxide comprises at least 10 wt. % of said catalytic composite.

4. The catalytic composite of claim 1 wherein said alkali metal hydroxide is sodium hydroxide.

5. The catalytic composite of claim 1 wherein said alkali metal hydroxide is potassium hydroxide.

6. The catalytic composite of claim 1 wherein said quaternary ammonium hydroxide is dimethylbenzylalkylammonium hydroxide.

7. The catalytic composite of claim 1 wherein said adsorptive support is an activated charcoal.

8. The catalytic composite of claim 1 wherein said metal chelate is a metal phthalocyanine.

9. The catalytic composite of claim 1 wherein said metal chelate is cobalt phthalocyanine.

10. The catalytic composite of claim 1 wherein said metal chelate is cobalt phthalocyanine monosulfonate.

11. The catalytic composite of claim 1 wherein said metal chelate is vanadium phthalocyanine.

* * * * *